United States Patent

Hartmann et al.

[11] 4,025,988
[45] May 31, 1977

[54] METHOD AND APPARATUS FOR CONTROLLING THE TOOLS AND GUIDES OF A FISH DRESSING MACHINE

[75] Inventors: Franz Hartmann, Bad Oldesloe; Heinrich Lück; Holger Gölnitz, both of Lubeck, all of Germany

[73] Assignee: Nordischer Maschinenbau Rud. Baader, Lubeck, Germany

[22] Filed: Mar. 11, 1976

[21] Appl. No.: 666,145

[30] Foreign Application Priority Data

Mar. 11, 1975 Germany .................... 2510421

[52] U.S. Cl. .................... 17/52; 17/54; 17/56; 426/231
[51] Int. Cl.² .................... A22C 25/16
[58] Field of Search ............. 17/52, 54, 57, 56, 61, 17/24, 46; 426/231, 479

[56] References Cited

UNITED STATES PATENTS

| | | | |
|---|---|---|---|
| 2,325,680 | 8/1943 | Hunt | 17/54 |
| 2,704,378 | 3/1955 | Schlichting | 17/57 X |
| 2,893,052 | 7/1959 | Schlichting | 17/54 |
| 3,187,375 | 6/1965 | Williamson et al. | 17/54 |
| 3,241,179 | 3/1966 | Schlichting | 17/52 |
| 3,908,230 | 9/1975 | Hartmann | 17/57 |

FOREIGN PATENTS OR APPLICATIONS

| | | | |
|---|---|---|---|
| 1,454,093 | 2/1969 | Germany | 17/54 |
| 2,400,677 | 7/1975 | Germany | 17/54 |

*Primary Examiner*—Louis G. Mancene
*Assistant Examiner*—Paul J. Hirsch
*Attorney, Agent, or Firm*—Edward F. Levy

[57] ABSTRACT

A method and apparatus for controlling the tools and machine is disclosed. A first selected location on the body of a fish conveyed in the direction of its longitudinal axis engages with a first feeler and effects an impulse counter to start to count pulses of a first frequency. A second selected location on the fish body then engages with another feeler and effects the impulse counter to count pulses of a second frequency and to add these pulses to the amount of pulses of the first frequency run up between the engagement of the first spot and the engagement of the second spot. If a designated total number of pulses, which is determined upon the distance between the place of engagement of the first feeler and the location of the tool to be controlled, have run up, the impulse counter is set to give a signal to a setting element controlling a tool or a guide so that the cutting of the fish is commenced at a precise desired point on the fish body.

9 Claims, 7 Drawing Figures

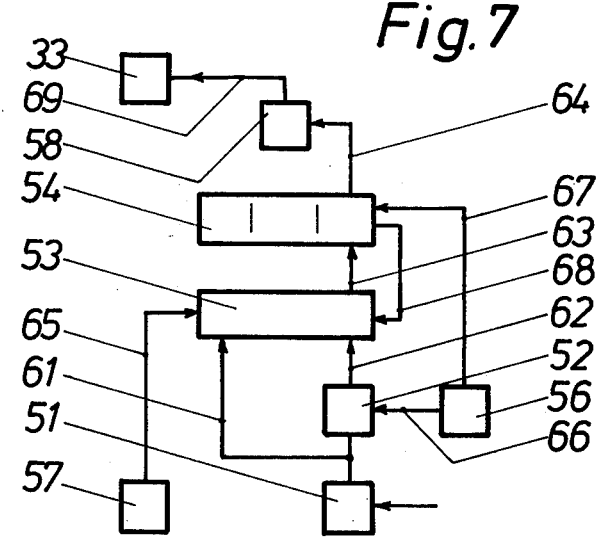

METHOD AND APPARATUS FOR CONTROLLING THE TOOLS AND GUIDES OF A FISH DRESSING MACHINE

The invention relates to a method and an apparatus for controlling the tools and guides of fish dressing machines by means of a first feeler adapted to be actuated by a first body location of a fish and a second feeler adapted to be actuated by a second body location of a fish, the section of the fish limited by the two body locations defining the measuring length of the fish to be used for controlling the tools and guides of the fish dressing machine.

In East German Pat. No. 87,139 an apparatus for controlling the tools and guides of a fish dressing machine is shown, in which a fish is engaged by a plurality of feelers, wherein each of the feelers, simultaneously engaged by a fish, actuates switch means to feed binary signals to a logic circuit, which binary signals carry information relating to the size of the fish just measured. This information may be used to control the setting of a tool or a guide, while the point of time for making a tool or guide operative is determined by a feeler situated in front of the tool or guide to be operated. Although complex electronic circuitry is employed, and many feelers are required, it is still impossible to arrive at an exact measurement of the size of the fish with this apparatus, particularly in view of the difficulty in arranging such feelers in close relationship one to another. Further it is not possible to make a tool or guide operative by means of the measurement of the size of the fish only.

It is the principal object of the present invention to control the tools and guides of a fish dressing machine in accordance with the measurement of the length of a selected portion of a fish. It is a further object of the invention to regulate the exact point of time during conveyance of a fish at which a tool or guide is made operative.

According to one aspect of the invention an apparatus for controlling the tools and guides on fish dressing machines comprises a first feeler adapted to be actuated by a first body location on a fish conveyed with constant speed, the first feeler actuating an impulse counter to start to count pulses generated by a first impulse generator, a second feeler adapted to be actuated by a second body location of the fish, the second feeler causing the impulse counter to change over counting pulses generated by a second impulse generator and to add these pulses to the number of pulses generated by the first impulse generator between the actuation of the first feeler and the actuation of the second feeler, the impulse counter being provided with a presetting stage enabling it to transmit a signal to a positioning element controlling a tool or a guide, when a defined total number of pulses for this tool or the guide have run up.

A particular advantage of the invention is the ability of obtaining accuracy of measurement in checking the measuring length, this accuracy depending on the level of pulse frequency only. It is a further advantage of the invention, that no more than two feelers are required to be used, to make the measurement and make it possible to control a number of dressing tools or guides. It is another advantage of the invention that the control of a plurality of tools and guides is possible without the existence of a memory.

According to another aspect of the invention, an apparatus for controlling the tools and guides of fish dressing machines comprises a first feeler adapted to be actuated by a first body location on a fish conveyed in the direction of its longitudinal axis, the first feeler effecting an impulse counter to start to count pulses generated by an impulse generator with a first frequency, a second feeler adapted to be actuated by a second body location on the fish, the second feeler effecting the impulse counter to change over to the counting of pulses of a second frequency generated by the impulse generator but modified by a frequency changer and to add these pulses to the number of pulses counted between the actuation of the first feeler and the actuation of the second feeler, the impulse counter being furnished with a presetting stage enabling it to give a signal to a positioning element controlling a tool or a guide, when a defined total number of pulses for this tool or this guide have run up.

It is an advantage of this aspect of the invention, that only one impulse generator is required for operation of this apparatus.

It is a further aspect of the invention, that in an apparatus for controlling the tools and guides of fish dressing machines conveying means engaging a fish at its first body location are constructed as a tail clamp engaging the fish at its tail portion or as a pushing saddle engaging the fish at the end of its belly, wherein these conveying means effect the impulse counter to count pulses of a first frequency and a second feeler engaging the second body location of the fish effects the impulse counter to change over to the counting of pulses of a second frequency and to add these pulses to the number of the pulses of the first frequency counted between the start of counting and the actuation of the second feeler, the impulse counter being furnished with a presetting stage enabling it to give a signal to a positioning element controlling a tool or a guide, when a defined total number of pulses for this tool or this guide have run up.

It is an advantage of this aspect of the invention, that spots of a fish difficult to be engaged by a feeler may easily be employed for measuring purposes.

It is a further aspect of the invention, that in an apparatus for controlling the tools and guides of a fish dressing machine an impulse generator, a logic circuit, a reset impulse counter and a positioning element for a tool or guide are connected in series, the logic circuit configuration is connected with the impulse generator by means of a stepping line and a branch wire, with the impulse counter by means of a counter line and a reset line and with switch means engageable by the feelers controlling the two body locations of a fish, a frequency changer is arranged in the branch wire between the logic circuit and the impulse generator and is connected with a presetting stage for setting the rate of charge of frequency, the presetting stage communicating with the impulse counter by means of an adjusting line.

It is an advantage of this aspect of the invention, that the control apparatus may be made as a plug-in unit with a printed circuit board in modular design, which unit may be interchanged easily in case of a trouble.

Additional objects and advantages of the invention will become apparent during the course of the following specification when taken in connection with the accompanying drawings, in which:

FIG. 7 is a functional block diagram of the electronic control and counting circuit components of the system of the present invention.

Figure 1:
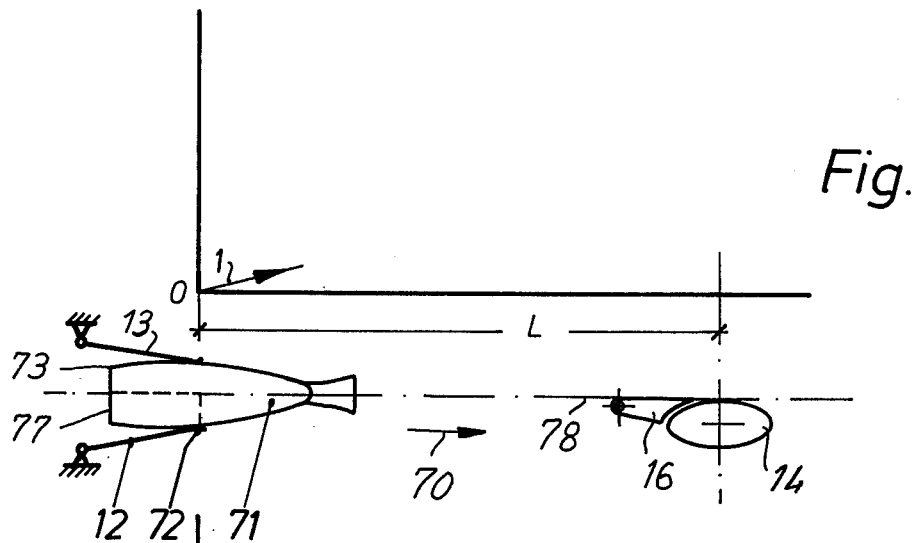
FIG. 1 is a diagrammatic side elevational view showing a fish being conveyed toward cutting or dressing tools and in a position in which it engages and actuates feeler members in accordance with the present invention to initiate the counting of pulses of a first frequency, this view including a diagram of coordinates showing the manner in which pulses are counted and totalled.
Figure 2:
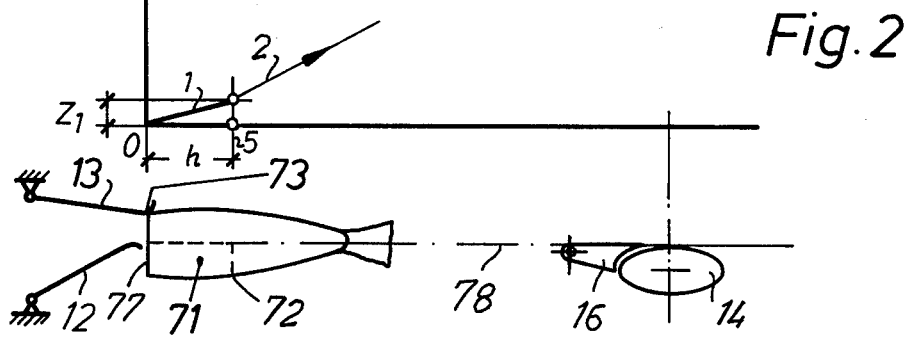
FIG. 2 is a diagrammatic side elevational view similar to FIG. 1, but showing the fish at a subsequent stage of its travel in which the counting of pulses of the first frequency has been terminated and the counting of pulses of a second frequency is about to commence.
Figure 3:
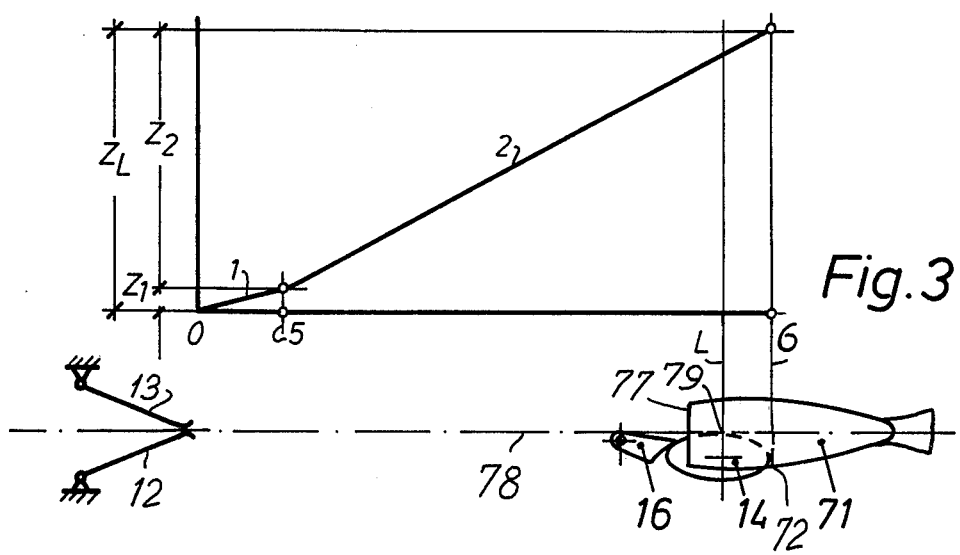
FIG. 3 is a diagrammatic side elevational view similar to FIGS. 1 and 2, but showing the fish at a further stage of travel, with the pulse count having been completed and the cutting tools having been actuated in response to the pulse count to cut the fish at the body location shown.

Referring in detail to the drawings, there is shown in FIGS. 1 to 3 a fish 71 transported belly-side down and tail leading through a portion of a fish dressing machine in the direction of the arrow 70 toward a cutting tool 14 of the dressing machine. The fish 71 has been beheaded along line 77 and is conveyed belly-side down and tail leading along a conveyor or track (not shown) conventional and well-known type along an axial path indicated by the broken line 78 in FIGS. 1–3.

In accordance with the invention herein, the length of the belly of the fish 71 will be employed as a measuring length to subsequently control the operation of the cutting tool 14 in a manner to be presently described. The measuring length is defined between the end of the fish belly designated by a first location 72 on the underside of the fish 71, and the cut off head end of the fish designated by a second location 73 on the fish body. A pivotally-mounted feeler member 12 is located along the path of travel of the fish, in a position to engage and sense the first location 72 as the latter passes said feeler member. Similarly, a second pivotally-mounted feeler member 13 is located to engage and sense the arrival of the second location 73 at the top of the cut end of the fish. The feeler members 12 and 13 are spring tensioned, weighted, or otherwise adapted to be biased toward the body of the fish which traverses these feeler members. The feeler members 12 and 13 are shown schematically herein, and may be of any suitable construction. Examples of feeler members which may be employed as sensors herein are shown, in detail, for example, in U.S. Pat. No. 2,893,052 issued July 7, 1959 and in U.S. Pat. No. 3,908,230 issued Sept. 30, 1975.

The cutting tool 14 may be a circular cutting knife of a fish filleting machine, which is employed to separate a strip containing the pinbones from each fillet of a fish. Alternatively, the cutting tool may be the cutting tool of a fish splitting machine which is adapted to cut the kidney and main backbone from a fish body. In any event, the cutting tool 14 is located a pre-selected fixed distance L from the point of action of the feeler members 12 and 13.

In FIG. 1, the fish 71 is shown travelling in the direction of arrow 70 toward the cutting tool 14 and in a position in which the first location 72 (at the end of the belly cavity) has reached and engaged the feeler member 12, causing the latter to pivot outwardly, against the biasing force thereon, and to actuate switch means to initiate the counting of pulses of a first frequency.

In FIG. 2, the fish 71 is shown as it has arrived at a position in which the second location 73 at the cut-off end of the head, engages the feeler member 13, and the latter is about to pivot downwardly under its biasing force as the cut-off end clears said feeler member 13. The belly feeler member 12 has cleared the cut-off end portion of the fish and is shown pivoting upwardly under its biasing force. Simultaneously, or immediately thereafter, the downward pivoting of the back feeler member 13 actuates switch means associated therewith to terminate the counting of pulses of the first frequency and initiate the counting of pulses of a second frequency, the latter pulses being added to the pulses of the first frequency which have already been counted.

In FIG. 3 the fish 71 is shown having been transported to a position in which the sum of both frequencies of the counted pulses has reached the total sum of pulses which corresponds to the position of the cutting tool 14. As this selected total number of pulses is reached and counted, the cutting supports 16 in front of the cutting tool 14 are opened so that the tool 14 is now in operative cutting position.

In FIGS. 1 to 3 a system of coordinates is shown graphically above the fish, feeler members and cutting tool in order to illustrate the relationship between the pulse counts, the measured fish length, the distance of travel of the fish and the timing of operation of the cutting tool. In this system of coordinates, the abscissa is parallel to the path of travel 78 of the fish and each index 0, 5 and 6 of this abscissa represents the distance through which the first body location 72 of the fish 71, constituting the end of the fish belly, has travelled since having been engaged by the feeler member 12. The ordinates $Z_1$, $Z_2$, $Z_L$ represents the amount of pulses run up and counted.

In FIG. 1, the fish 71 has arrived at a position in which the first body location 72 has engaged feeler member 12 and pivoted the latter to the position in which it initiates the counting of pulses of a first frequency. The selected frequency of these pulses is such that as the fish 71 leaves the abscissa point 0, the pulses of the first frequency will follow a straight line 1 of the inclination shown on the system of coordinates.

In FIG. 2, the fish 71 has been conveyed to a position in which the feeler member 12 has reached the cut-off head end of the fish and is released to pivot to its biased position. The pulses of the first frequency have followed the straight line 1 and have run up to the ordinate $Z_1$ with the first body location 72 located at the abscissa 5. Simultaneously, the upper feeler member 13 has come into engagement with the second body location 73, and from this time pulses of the first frequency are terminated and pulses of the second, higher frequency will be generated and counted to follow a second straight line 2 of an inclination differing from that of line 1.

FIG. 3 shows the position of fish 71 when the pulses of the second frequency, following the straight line 2, have run up to a number of pulses $Z_2$. If the sum of the pulses $Z_1$ and $Z_2$ total the amount of $Z_L$, the fish 71 has been conveyed to a position in which the end of its belly, designated by body location 72, has arrived at the abscissa index 6 which is further distant from the starting point 0 than is the pinbone cutting tool 14. In spite of the low frequency along line 1, which may be one-third of the frequency of line 2, the cutting tool 14 is actuated to make pinbone cuts in the fish 71 at the precise moment at which two-thirds of the fish belly has passed by the cutting surface of the cutting tool 14. This point on the fish body, at which the cutting of the fish is commenced, is designated by reference numeral 79 in FIG. 3. It will thus be appreciated that the frequency rate of the first pulse count represented by line 1 is so selected that when the belly length of the fish 71 is measured by the feeler member 12, the cutting tool 14 will be operated to engage and cut the belly of the fish at the precise time that the body point 79 arrives at the cutting tool 14, so that the proper cut is made in the belly region of the fish 71 to remove the pinbones.

Figure 4:
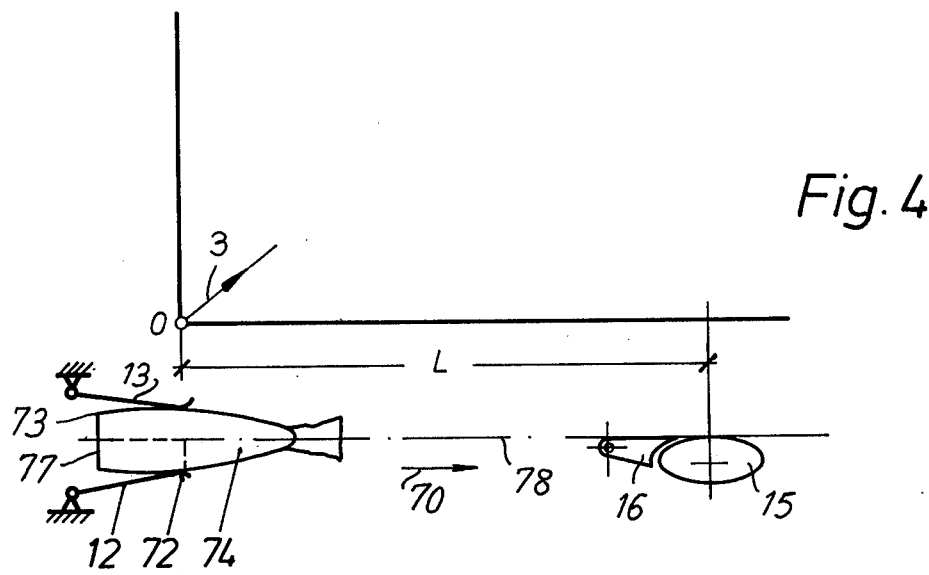
FIGS. 4–6 are diagrammatic side elevational views similar to FIGS. 1–3, but showing the pulse count and acutation of the cutting or dressing tools for cutting the fish at a different selected location on the fish body.
Figure 5:
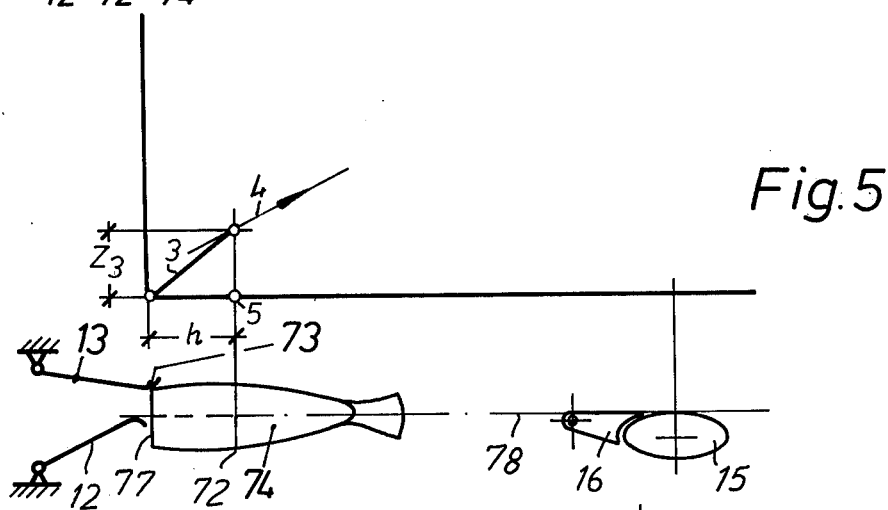
Figure 6:
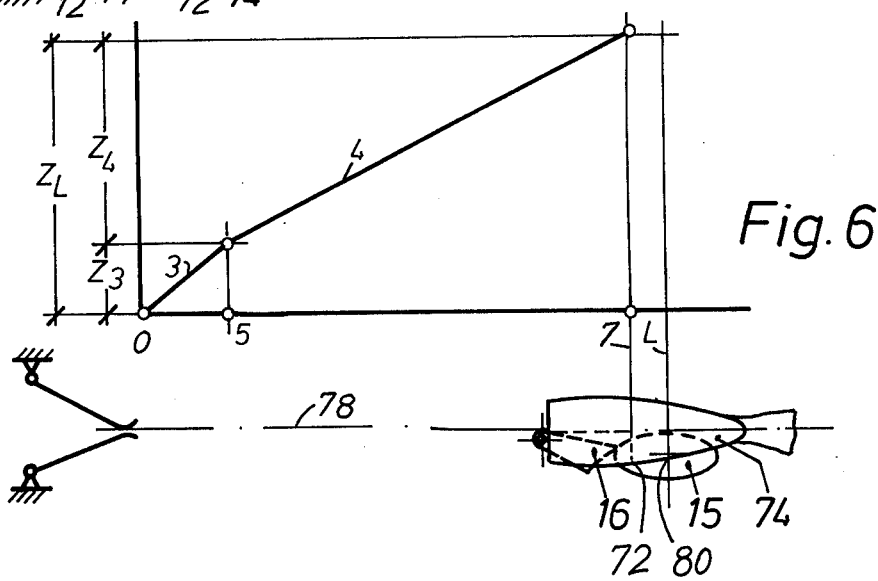

On the other hand, if a different cutting operation is desired, the cutting tool may be timed to engage and begin cutting at a different point on the fish body, by changing the frequency value of the first pulse count. FIGS. 4 to 6 illustrate, as an alternative embodiment, an arrangement in which a fish 74 is conveyed toward a cutting tool 15 which may be, by way of example, is of the type adapted to cut the kidney and main backbone from the body of fish 74. For this type of cutting operation, it is necessary for the cut to commence before the end of the fish belly arrives at the cutting tool 15, that is at the point 80 on the fish body spaced rearwardly of the body location 72.

In FIG. 4, the fish 74 is shown in the position in which the lower belly feeler member 12 is in engagement with the body location 72 and the feeler member 12 is initiating the counting of pulses of a first frequency, which, in this instance, is of a frequency value indicated by the straight line 3 of the system of coordinates shown in FIG. 4. This line 3 is of a greater angular inclination than the corresponding straight line 1 of the embodiment of FIGS. 1–3, since the first pulses are at a higher frequency than the first pulses of the previous embodiment.

In FIG. 5, the fish 74 has arrived at a position in which the belly feeler member 12 has passed the cut-off head portion 77 of the fish 74 and has been biased inwardly. The upper feeler member 13 has contacted the second body location 73 and is about to terminate the counting of pulses of the first frequency and commence the counting of pulses of the second frequency. The pulses of the first frequency have followed the straight line 3 and have run up to the ordinate $Z_3$, with the first body location 72 located at the abscissa 5. The belly length of the fish 74 has thus been measured and is represented by the coordinate $Z_3$, 5.

In FIG. 6, the fish 74 has arrived at a position in which the point 80 on the fish body has arrived at the cutting area of the cutting tool 15 during which travel, pulses of the second frequency have been generated and counted. These pulses of the second frequency have followed the straight line 4 shown in FIG. 6, and have run up to a number of pulses $Z_4$. If the number of pulses $Z_3$ and $Z_4$ have totalled an amount $Z_L$, the fish has been conveyed to a position in which the body point 80, rearwardly of the fish belly, has arrived at the abscissa index 7, which is a shorter distance from the starting point 0 than is the cutting tool 15. Since the pre-selected total number of pulses $Z_L$ has been reached, this total number count is fed to that portion of the apparatus which opens the cutting supports 16 associated with the cutting tool 15, so that the tool 15 is brought to its operative position and begins to cut the fish 74 at its proper body point 80. Simultaneously, the control system of FIG. 6 terminates the counting of pulses and resets the pulse timer in preparation for the arrival of the next fish, in a manner to be presently described.

When the next fish on the conveyor reaches the feeler members 12 and 13, the latter are pivoted outwardly, and the entire operation is repeated, the cutting tool 15 having been returned automatically to inoperative position.

In comparing the respective coordinate systems of FIGS. 1–3, with those of FIGS. 4–6, it will be seen that since the second pulse frequencies of both embodiments are identical, the line 2 of FIG. 3 is at the same inclination as the line 4 of FIG. 6, that is to say lines 2 and 4 are parallel to each other. On the other hand, since the first pulse frequency of the embodiment of FIGS. 1–3 is different from the first pulse frequency of FIGS. 4–6, the line 1 of FIG. 3 is at a lesser inclination than the line 3 of FIG. 6. Consequently, the total number of pulses $Z_L$ in FIG. 3 is only reached at abscissa index 6 representing the position of fish 71 in which the end of its belly cavity is already past the operative position of the cutting tool 14. In contrast, the inclination of the straight line 3 in FIG. 6 is of a steeper inclination than line 4, as a result of the first pulse frequency being slightly greater than the second pulse frequency in this embodiment. Consequently the total number of pulses $Z_L$ in FIG. 6 is already reached at abscissa index 7, corresponding to the position of fish 74 wherein the belly cavity has not yet reached the operative area of the cutting tool 15, so that the cutting of the fish 74 has been commenced outside of its belly cavity.

The block diagram of FIG. 7 illustrates the manner in which the feeler members control the generation and counting of pulses for operation of the cutting tools. An impulse generator 51 is shown in line with a logic circuit 53, an impulse counter 54, a pulse duration 58, and a positioning element 33 adapted to control the tools or guides of a fish dressing machine, for example cutting tools 14 or 15 of FIGS. 1 and 4.

A stepping line 61 connects the impulse generator 51 directly with the logic circuit 53, whereas a branch wire 62 connects the impulse generator 51 to the logic circuit 53 through the intermediary of a frequency charger 52, which is in line with a presetting stage 56 by means of a preselector line 66. A counter line 63 and a reset line 68 connect the logic circuit 53 with the impulse counter 54, whereas an adjusting line 67 connects the latter with the presetting stage 56. Connecting line 64 connects the impulse counter 54 with the pulse duration 58, and connecting line 69 connects the latter with the positioning element 33. In order to operate this electronic arrangement, switch means 57, operated by the feeler members 12, 13 is connected with the logic circuit 53 by means of a trip line 65.

When the fish 71 has reached the position of FIG. 1 in which the first selected location 72 engages the feeler member 12, the latter operates the switch means 57 which energizes the logic circuit 53. Pulses generated by the impulse generator 51, and modified or converted into the first pulse frequency by the frequency charger 52, are fed to the impulse counter 54 via the branch wire 62 and the counter line 63. The impulse counter 54 is thus counting the pulses of the first frequency.

When the fish 71 reaches the position of FIG. 2 with the feeler member 13 engaging the cut-off head portion of the fish, the feeler 13 will clear the fish body and pivot downwardly, the feeler member 13 actuating the switch means 57 to send a signal to the logic circuit 53 such as to stop the pulses flowing through the branch wire 62 from reaching the impulse counter 54. Simultaneously, the stepping line 61 is opened so that the pulses from the impulse generator 51 may now reach the impulse counter 54 through the counter line 63, and without the pulses passing through the frequency charger. These pulses (of the second frequency) are received by the impulse counter 54 and added to the pulses of the first frequency which have already been counted.

As soon as the pulses counted within the impulse counter 54 have reached a preselected amount, the impulse counter 54 releases a control signal which passes through connecting line 64 and pulse duration 58 and then operates the positioning element 33. The positioning element 33 is preferably in the form of an electromagnet or an electrically-operated power drive which is coupled to the cutting supports 16 located in front of the cutting tool 14, so as to cause the cutting supports 16 to swivel downwardly and clear the cutting edge of the cutting tool 14 for the cutting operation.

Simultaneously with the sending of the control signal through the connecting line 64, a further control signal is transmitted from the impulse counter 54 via the reset line 68 into the logic circuit 53, this second control signal interrupting the stepping line 61 as well as the branch wire 62, thus returning the system to its original condition for the processing of a new signal transmitted by the feeler member 12 via the switch means 57 and the trip line 65. The impulse counter 54 will also be reset to its zero level via the counter line 63 before the system is made ready to receive a further signal from the switch means 57. In addition, a control element is included in the logic circuit 53 or the pulse duration 58 for automatically returning or restoring the positioning element 33 to its inoperative position after a predetermined time interval, thereby causing the cutting supports 16 to return to their closed positions.

Upon the arrival of the next fish carried by the conveyor, the entire operation as repeated, the feeler members 12 and 13 initiating control signals by means of the switch means 57, the control signals starting the counting of pulses, and the positioning element 33 being operated in response to such pulses to control the operation of the cutting tools.

In order to permit the processing of different types of fish or to perform different types of cuts in the same type of fish, the system may be provided with a presetting stage 56 which may be set or adjusted either manually or by programming means. The presetting stage is employed to adjust at least the frequency charger 52.

While preferred embodiments of the invention have been shown and described herein, it is obvious that numerous omissions, changes and additions may be made in such embodiments without departing from the spirit and scope of the invention.

What is claimed is:

1. A method for controlling the operation of tools and guides on fish dressing machines, including the steps of:

conveying a fish in the direction of its longitudinal axis at a constant speed toward at least one tool,
   detecting a first body location on said fish as said body location reaches a designated point along the path of travel of said fish,
   initiating the counting of pulses of a first frequency in response to the detection of said first body location,
   detecting a second body location on said fish as said second body location reaches a designated point along the path of travel of said fish,
   terminating the counting of pulses of said first frequency and initiating the counting of pulses of a second frequency in response to said detection of said second body location,
   adding the pulses of said second frequency to the pulses of said first frequency until the pulses counted reaches a preselected total number of pulses,
   and sending a signal to a tool control element for operating said tool to cut said fish at the moment that said preselected total number of pulses has been counted.

2. Apparatus for controlling the tools and guides of fish dressing machines in which fish are conveyed in succession at constant speed toward said tools and guides, said apparatus comprising:

first feeler means adapted to be actuated by contact with a first body location on a fish conveyed thereto,
   impulse generating means adapted to generate electrical pulses of a first frequency in response to actuation of said first feeler means,
   an impulse counter connected to said impulse generating means,
   second feeler means adapted to be actuated by contact with a second body location on said fish upstream of said first body location,
   said second feeler means being operatively connected to said impulse generating means for causing the latter to generate electrical pulses of a second frequency in response to actuation of said second feeler means, and to transmit said pulses of said second frequency to said impulse counter instead of said pulses of said first frequency,
   said impulse counter being adapted to add the pulses of said second frequency to the number of pulses of the first frequency counted during the period between actuation of the first feeler means and actuation of the second feeler means,
   positioning means for controlling the operation of at least one of said tools and guides,
   said impulse counter including means for energizing said positioning means in response to the counting of a designated total number of pulses by said impulse counter.

3. Apparatus according to claim 2 in which said impulse generating means includes a first impulse generator for generating pulses of said first frequency, and a second impulse generator for generating pulses of said second frequency.

4. Apparatus according to claim 2 in which said impulse generating means includes an impulse generator and a frequency charger connected with said impulse generator for modifying the frequency of the pulses fed by said impulse generator to said impulse counter, said impulse generator being connected to said impulse counter through said frequency charger in response to actuation of one of said feeler means, and being connected to said impulse counter, by-passing said frequency charger, in response to actuation of said other feeler means.

5. Apparatus according to claim 2 which also includes a presetting stage for setting into said impulse counter the total number of pulses required to enable said impulse counter to energize said positioning means.

6. Apparatus according to claim 2 which includes conveying means for gripping the body of a fish and conveying it at said constant speed, and in which said first feeler means contacts said first body location on the fish.

7. Apparatus according to claim 2 in which said impulse generating means comprises an impulse generator, and said positioning means comprises a positioning element, said impulse generator being connected in series with said positioning element through a logic circuit and said impulse counter, said logic circuit being connected to the impulse counter by a stepping line and a branch wire, said logic circuit being connected to said impulse counter by a counter line and a reset line, and a frequency charger is arranged in said branch wire between said logic circuit and said impulse generator.

8. Apparatus according to claim 7 in which said first and second feeler means control switch means connected to said logic circuit.

9. Apparatus according to claim 8 in which also includes a presetting stage for setting the pulse charging rate of said frequency charger, said presetting stage being connected to said frequency charger through a preselector line, and to said impulse counter through an adjusting line.

* * * * *